United States Patent [19]

Tsuchiya

[11] 3,860,954

[45] Jan. 14, 1975

[54] COLOR SYNCHRONIZATION CONTROL CIRCUIT WITH GENERATION OF COLOR KILLER SIGNAL

[75] Inventor: Takao Tsuchiya, Kanagawa-ken, Japan

[73] Assignee: Sony Corporation, Tokyo, Japan

[22] Filed: Jan. 15, 1973

[21] Appl. No.: 323,473

Related U.S. Application Data

[63] Continuation of Ser. No. 131,204, April 6, 1971, abandoned.

[30] Foreign Application Priority Data

Apr. 7, 1970 Japan .............................. 45-29688
Apr. 7, 1970 Japan .............................. 45-33572

[52] U.S. Cl. ...................... 358/25, 358/19, 358/26, 307/232, 331/11, 331/12, 331/20, 331/27

[51] Int. Cl. ......................... H04n 9/46, H04n 9/48

[58] Field of Search.. 178/5.4 SY, 5.4 CR, 69.5 CB; 307/232; 328/133, 134, 155; 331/8, 11, 12, 17, 20, 25, 27, 32

[56] References Cited

UNITED STATES PATENTS 2,930,842 3/1960 Leyton .......................... 178/5.4 SY
3,499,984 3/1970 Inoue ............................ 178/69.5 F

FOREIGN PATENTS OR APPLICATIONS 1,063,120 3/1967 Great Britain ..................... 307/232

*Primary Examiner*—Robert L. Griffin
*Assistant Examiner*—George G. Stellar
*Attorney, Agent, or Firm*—Lewis H. Eslinger; Alvin Sinderbrand

[57] ABSTRACT

An automatic phase-control circuit for a reference sub-carrier oscillator of color television receivers, which includes a phase comparing means for comparing a phase of output of the reference sub-carrier oscillator with a phase of a burst signal in a color television signal received by the receiver to control the reference sub-carrier oscillator in synchronism with the burst signal with the phase-compared output. A peak-detector means is provided to detect a peak voltage value of the output of the phase comparing means to produce a direct voltage in response to that value, so that a control signal sufficient for stable and effective control of the reference sub-carrier oscillator is obtained.

4 Claims, 10 Drawing Figures

INVENTOR.

TAKAO TSUCHIYA

BY

Lewis H. Eslinger

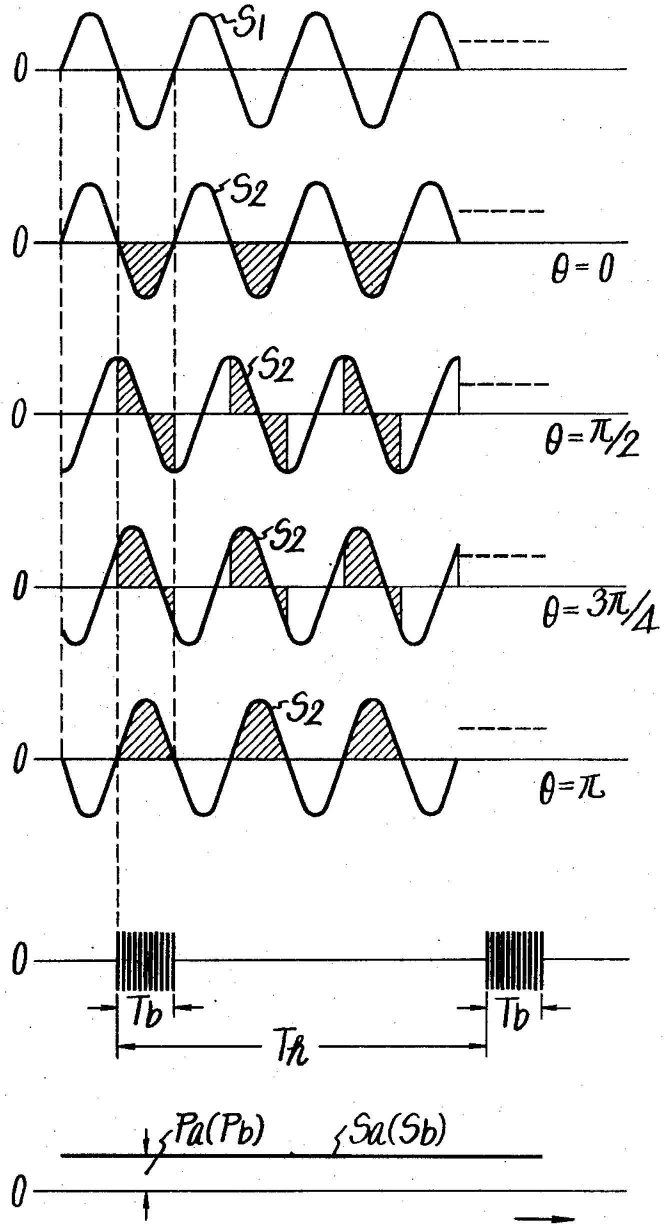
Fig. 2A, Fig. 2B1, Fig. 2B2, Fig. 2B3, Fig. 2B4, Fig. 2C, Fig. 2D
INVENTOR.
TAKAO TSUCHIYA
BY
Lewis H. Eslinger INVENTOR
TAKAO TSUCHIYA
BY
Lewis H. Eslinger

COLOR SYNCHRONIZATION CONTROL CIRCUIT WITH GENERATION OF COLOR KILLER SIGNAL

This is a continuation of application Ser. No. 131,204, filed Apr. 6, 1971, now abandoned.

BACKGROUND OF THE INVENTION

1. Field of the Invention

This invention relates generally to a phase control system for oscillators and, particularly, to a circuit for automatically phase-controlling a reference sub-carrier oscillator of color television receivers in accordance with a color synchronizing signal.

2. Description of the Prior Art

Color television receivers employ an automatic control circuit for comparing the phase of a color synchronizing burst signal with that of a reference sub-carrier signal generated in the receiver. The purpose of this is to hold the phase of the sub-carrier at a constant value relative to the burst signal for proper color demodulation. The burst signal is intermittently produced for a short period during each horizontal line interval so that the compared output is also intermittently obtained. Therefore, it is standard practice to pass the compared output through a low-pass filter to provide a direct voltage by which the reference sub-carrier oscillator is controlled. In such a case, however, averaging the compared output by the low-pass filter reduces the level of the direct voltage to an extremely small value resulting in difficulty in the phase control.

Color television receivers normally include color killer circuits that make the color circuit inoperative when the signal being received is not a color signal. In circuits of the type described above, sufficient color killing cannot be achieved due to the lowering of the direct voltage level. Therefore, a separate color killer detector has been required in prior color television receivers.

A primary object of this invention is to provide an improved phase control circuit for oscillators.

Another object is to provide an improved color synchronization control circuit that produces a voltage for stable and effective control of a reference sub-carrier oscillator in a color television receiver.

Another object of this invention is to provide an improved color synchronization control circuit that also produces a voltage for controlling a color killer circuit in a color television receiver.

Other objects, features, and advantages of this invention will become apparent from the following description taken in conjunction with the accompanying drawings.

SUMMARY OF THE INVENTION

The invention comprises a differential amplifier phase comparison circuit. The burst signal is connected in opposite polarity to the two input transistors of the amplifier. Switching transistors in parallel with the amplifying transistors are controlled by the locally generated oscillations to allow the amplifying transistors to operate only half of each cycle of the locally generated oscillations. The output signals of the differential amplifier are oppositely polarized parts of the burst signal and are connected to separate detector and filter circuits that produce peak output direct voltages. These direct voltages are connected to the input circuits of another differential amplifier to produce differential output signals to be applied to a control element, such as a voltage-controlled capacitor, that controls the frequency of the locally-generated oscillations. Filtered outputs of the detectors are combined to form signals that control color killer circuits.

BRIEF DESCRIPTION OF THE DRAWING

FIGS. 2A through 2D and 3A and 3B are graphs for explaining the operation of the circuit in FIG. 1.

DETAILED DESCRIPTION OF THE INVENTION

Figure 1:
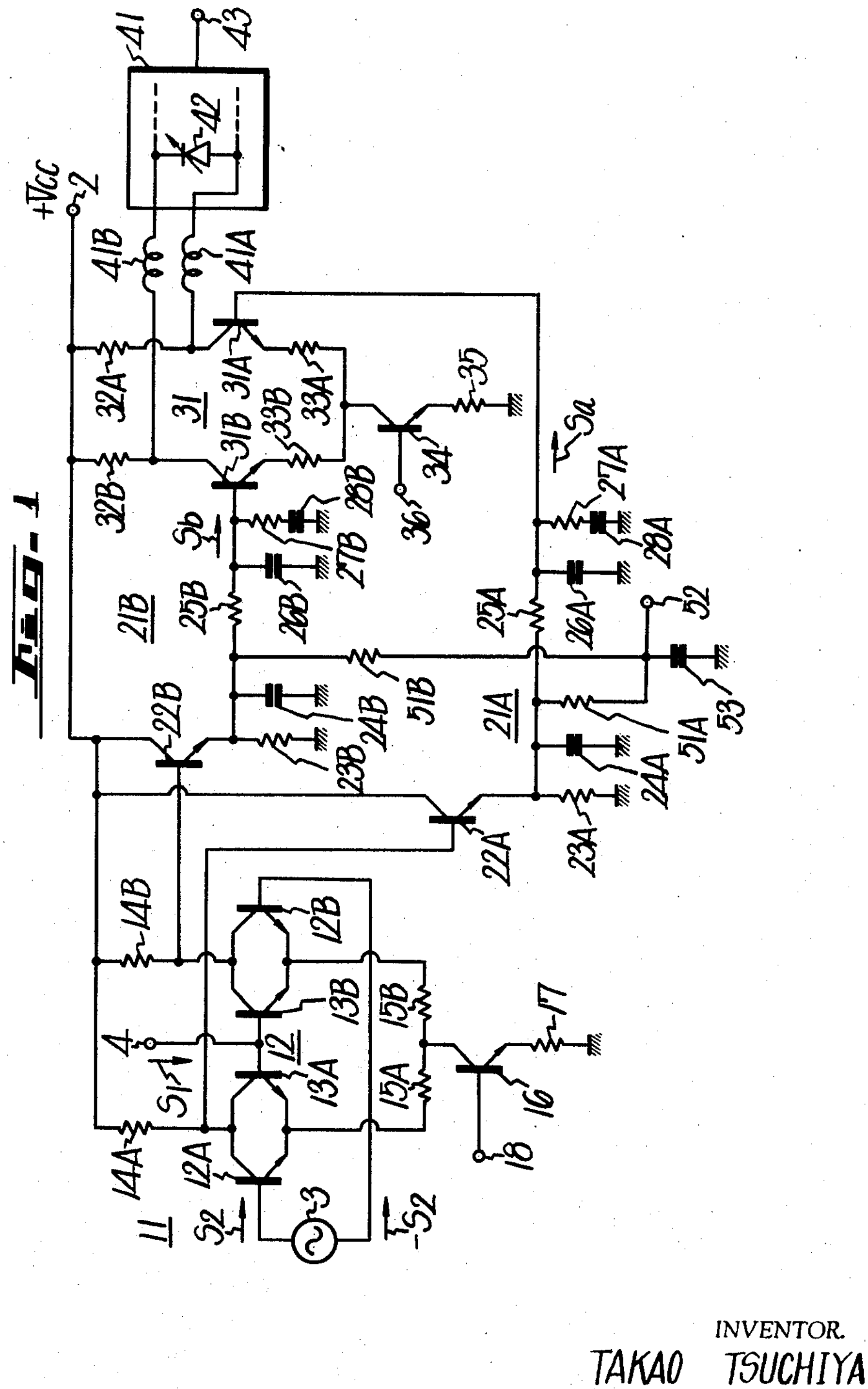
FIG. 1 is a connection diagram showing one example of a color synchronization control circuit of this invention.

The circuit in FIG. 1 includes a terminal 2 for connection to a voltage supply source $V_{CC}$. A source 3 of a television burst signal supplies the input signal to be compared in phase with a locally generated signal applied to a terminal 4. The source 3 and the terminal 4 are connected to a phase detector 11, which is basically a differential amplifier 12 comprising two transistors 12A and 12B. The bases of the transistors 12A and 12B are connected to the source 3 and their collectors are connected to the voltage supply terminal 2 by way of load resistors 14A and 14B, respectively. The emitters of the transistors 12A and 12B are connected in series with a constant current circuit comprising resistors 15A and 15B in series with the emitter-collector circuit of a transistor 16 which in turn is connected to ground by a resistor 17. An input terminal 18 connects the base of the transistor to a fixed source (not shown).

Two switching transistors 13A and 13B have their emitter-collector circuits connected directly in parallel with the emitter-collector circuits of the transistors 12A and 12B. The bases of the transistors 13A and 13B are connected directly together to the input terminal 4.

One output of the differential amplifier 12 is taken from the collector of the transistor 12A and is connected to peak detector circuit 21A. The input terminal to this detector is the base of a transistor 22A connected as an emitter-follower transistor circuit. In the emitter circuit of the transistor 22A is a low pass filter circuit comprising a transistor 23A in parallel with a capacitor 24A. A series resistor 25A is connected to the common connection of the emitter of the transistor 22A and the resistor 23A. The other end of the resistor 25A is connected to a capacitor 26A that also serves as a filter element and to one terminal of a resistor 27A connected in series with a capacitor 28A.

The circuit includes a second peak detector 21B identical with the first one except that the elements are identified by the letter B in place of the letter A and the peak detector transistor 22B is connected to the collector of the transistor 12B.

The outputs of the filter circuits of the peak detectors are connected to another differential amplifier 31 comprising two transistors 31A and 31B having collector loads 32A and 32B, respectively. Resistors 33A and 33B are connected in series with the emitters of the transistors 31A and 31B, respectively, and are connected together to the collector of a transistor 34, the emitter of which is grounded by a resistor 35. A fixed bias input terminal 36 is connected to the base of the transistor 34.

The outputs of the differential amplifier 31 are taken from the collectors of the transistors 31A and 31B and are connected through coils 41A and 41B to the anode and cathode of a voltage-controlled variable copacitance diode 42 that serves as an automatic frequency controlling element for an oscillator 41. The oscillator may have several output terminals, one of which is indicated by reference 43. One of the output terminals of the oscillator 41 is connected back to the input terminal 4 to supply locally generated sub-carrier oscillations to the phase detector 11.

In accordance with the present invention, the outputs of the detector circuits 21A and 21B are connected by resistors 51A and 51B to an output terminal 52. A filter capacitor 53 connects the terminal 52 to ground. The terminal 52 serves as a source of a color killer signal in a television receiver utilizing the circuit of this invention.

The operation of the circuit in FIG. 1 will be described with reference to the graphs in FIGS. 2 and 3.

The locally-generated sub-carrier reference oscillator signal is indicated by reference numeral $S_1$ in FIG. 2A and is applied to the terminal 4 in FIG. 1. The nature of the switching transistors 13A and 13B is such that when the signal $S_1$ is positive, both of these transistors are conductive and are, in effect, short circuits across the emitter-collector circuits of the transistors 12A and 12B. During the other half of each cycle of the signal $S_1$, the transistors 13A and 13B are the equivalent of open circuits and have no effect on the operation of the differential amplifier 12. As shown in FIG. $2B_1$, the transistors 12A and 12B are thus able to amplify the signal from the source 3 during each negative half cycle of the signal $S_1$.

FIG. $2B_1$ shows that if the incoming burst signal $S_2$ is in phase with the locally generated signal $S_1$ so that the phase difference $\theta$ between signals $S_1$ and $S_2$ is zero, the entire negative half of each cycle of the burst signal $S_2$ is amplified by the transistor 12A and applied to the peak detector circuit 21A. FIG. $2B_2$ shows that if there is a phase difference $\theta$ of 90°, or $\pi/2$, between the burst signal $S_2$ and the locally generated signal $S_1$, half of each positive cycle and half of each negative cycle of the burst signal $S_2$ will be amplified by the amplifier 12A. FIG. $2B_3$ shows the corresponding condition if the phase difference $\theta$ is $3\pi/4$ and FIG. $2B_4$ shows the fact that the positive half of each cycle of the burst signal $S_2$ will be amplified by the amplifier 12A if the phase difference between the burst signal $S_2$ and the locally generated signal $S_1$ is 180°, or $\pi$. The differential amplifier 12 thus serves as a synchronous detector for the burst signal.

The operation of the transistor 12B is the converse of that of the transistor 12A. However, the transistor 13B is conductive and non-conductive during the same intervals of time as the transistor 13A. As a result, if the burst signal $S_2$ is in phase with the locally generated signal $S_1$ as shown in FIG. $2B_1$, the corresponding burst signal $-S_2$, applied to the base of the transistor 12B, will be inverted from the waveform shown in FIG. $2B_1$, and the positive half of each cycle of the signal $-S_2$ will be amplified by the amplifier 12B.

Figures 3A, 3B:
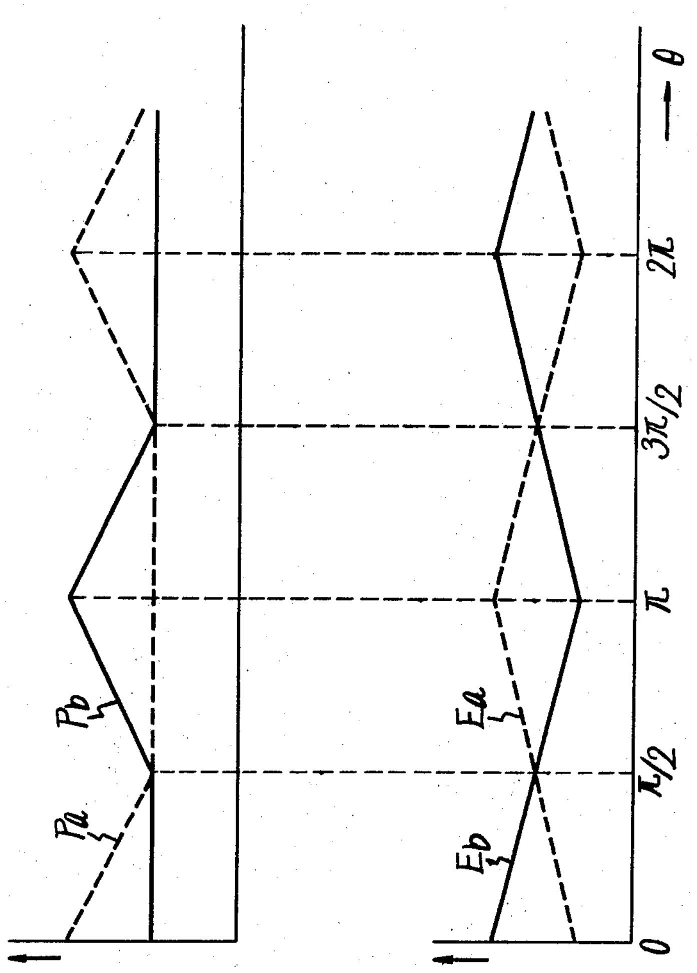

The detected output of the transistor 12A is reversed in phase so that the positive peak value Pa of each cycle of the detected output derived from the collector of the transistor 12A varies with the phase difference $\theta$ as indicated by a dotted line in FIG. 3A. On the other hand, the transistor 12B is supplied with the burst signal $-S_2$ of opposite polarity to that supplied to the transistor 12A and, as a result, the peak value P*b* of each cycle of the detected output from the collector of the transistor 12B is displaced 180° from the peak value P*a* and varies as indicated by the solid line in FIG. 3A.

The detected outputs, whose peak values P*a* and P*b* vary with the phase difference $\theta$ between the reference subcarrier signal $S_1$ and the burst signal $S_2$, are intermittently obtained only during the short intervals $T_b$ that occur during the horizontal synchronization pulse at the end of each scanning line interval $T_h$ as shown in FIG. 2C. It should be noted that the time axis in FIG. 2C is different from that in FIGS. 2A–$2B_4$. The peaks of the synchronously detected outputs are detected by the circuits 21A and 21B to derive continuous signals S*a* and S*b* as illustrated in FIG. 2D. The output levels of these signals S*a* and S*b* correspond, respectively, to the peak values of the detected outputs derived from phase detector circuit 11.

The detected outputs S*a* and S*b* are applied to the differential amplifier 31 and cause the collector potentials of the transistors 31A and 31B to vary according to the graphs E*a* and E*b*. These collector potentials change in opposite directions as the phase difference $\theta$ between the reference sub-carrier signal $S_1$ and the burst signal $S_2$ is changed, as depicted in FIG. 3B. By virtue of the fact that these opposing collector potentials E*a* and E*b* are applied to the differential amplifier 31, a potential equal, in effect, to the difference between them, is applied to the diode 42 to hold the oscillation frequency and phase relationship of the oscillator 41, that is, the reference sub-carrier frequency, at a constant value.

In accordance with the present invention, the oscillation frequency of the oscillator 41 is controlled by the continuous signals S*a* and S*b* obtained by peak detection of the bursts shown in FIG. 2C. This insures that the compared outputs S*a* and S*b* will be of high level without the necessity of lowering the levels of the signals Sa and Sb in accordance with the procedure of averaging described in connection with the prior art. Accordingly, the control sensitivity, or loop gain, of the color synchronization control circuit rises to provide a reference sub-carrier signal having a constant phase and frequency, thereby enabling faithful reproduction of the color television image.

During reception of a color television signal, the burst signal $S_2$ is produced every period T*h*. The signals S*a* and S*b* are derived from the terminal 52 through the resistors 51A and 51B, thereby indicating the presence of the burst signal $S_2$. The levels of the signals S*a* and S*b* are peak values as above described, and hence are high. Accordingly, the signals S*a* and S*b* can be used as color killer signals. Thus, the present invention provides for enhanced control sensitivity of the color synchronization control circuit and produces a color killer signal of sufficiently high level without the use of a special color detector circuit.

Generally, the level of a signal is raised by way of amplification, in which case, however, drift in the output level due to temperature change and the like presents a problem. With the present invention, however, a high output level is obtained by peak detection so that no drift is caused in the output level.

Further, the number of capacitors employed is small and their capacitances need not be so great as will be seen from the foregoing. This allows ease in the making of the circuit of this invention in the form of an integrated circuit.

Although the pair of peak value detector circuits 21A and 21B are provided, either one of them may be omitted because the output of each detector circuit is a phase-compared output. In such a case, the peak value detector circuit constitutes the color synchronization control circuit and a killer signal can be obtained.

I claim as my invention:

1. A color synchronization control for color television receivers comprising means comprising an oscillator for generating a reference sub-carrier signal for demodulation of a color television signal; a first differential amplifier comprising first and second amplifier transistors and differential input terminals to receive a color synchronization signal contained in the color television signal each of said transistors comprising an emitter-collector circuit; switching means connected to said oscillator to receive a switching signal therefrom and comprising third and fourth transistors, each comprising an emitter-collector circuit connected in parallel with the emitter-collector circuits of said first and second transistors respectively, to cause said amplifier to be intermittently operative, for producing first and second output signals related to the phase difference between a part of the output of said oscillator and said synchronizing signal, said first and second detected output signals being of opposite phase to each other; first peak detector means for producing a first direct voltage output in response to the peak voltage value of the first output signal of said differential amplifier; a second peak detector means for producing a second direct voltage output signal of said differential amplifier; means for producing a third direct voltage output in proportion to the voltage difference between said first and second direct voltage outputs; and means for applying said third direct voltage output to said oscillator to control it in synchronism with the color synchronizing signal.

2. A color synchronization control for color television receivers according to claim 1, comprising, in addition, first and second low-pass filters connected to output terminals of said first and second peak detector means, respectively, both of said filters being connected to said means for producing a third direct voltage.

3. A color synchronization control circuit for color television receivers according to claim 1 in which said third direct voltage output producing means is a second differential amplifier and said third direct voltage output includes a pair of voltages varying oppositely to each other.

4. A color synchronization control circuit for color television receivers according to claim 1 in which additional means is connected to both of said peak detector means to combine the first and second direct voltage outputs therefrom for a color-killer operation.

* * * * *